GROUNDED GRID POWER AMPLIFIER

Filed April 20, 1953 3 Sheets-Sheet 1

INVENTOR.
WARREN B. BRUENE
BY Marvin Moody
ATTORNEY

GROUNDED GRID POWER AMPLIFIER

Filed April 20, 1953

3 Sheets-Sheet 2

INVENTOR.
WARREN B. BRUENE
BY Marvin Moody
ATTORNEY

Oct. 22, 1957 W. B. BRUENE 2,810,793

GROUNDED GRID POWER AMPLIFIER

Filed April 20, 1953 3 Sheets-Sheet 3

INVENTOR.
WARREN B. BRUENE
BY Marvin Moody
ATTORNEY

United States Patent Office 2,810,793

Patented Oct. 22, 1957

2,810,793

GROUNDED GRID POWER AMPLIFIER

Warren B. Bruene, Cedar Rapids, Iowa, assignor to Collins Radio Company, Cedar Rapids, Iowa, a corporation of Iowa Application April 20, 1953, Serial No. 349,606

8 Claims. (Cl. 179—171)

This invention relates in general to load regulated grounded-grid power amplifiers and in particular to a means for maintaining an optimum load on a grounded-grid power amplifier.

The last amplification stage in a radio frequency transmitter is generally a power amplification stage which delivers power to an ultimate load such as to an antenna. The grounded-grid amplifier circuit used in this invention, offers special power amplification advantages at high frequencies. The incoming signal is impressed between cathode and ground of an electron tube in a grounded-grid circuit.

The load on a power amplifier may vary in an unpredictable manner. Antenna impedance, for example, does not remain constant due to numerous unforeseeable circumstances such as high humidity, ice formation, and the effect of other antennas in close vicinity. Changes in antenna impedance vary the load on the power amplifier.

The tube in a power amplifier circuit will operate best at a designated constant optimum load resistance. It is therefore the principal object of this invention to maintain an optimum resistive load on a grounded-grid power amplifier.

A variable antenna impedance will often have a reactive component as well as a resistive component which will also be coupled into the plate circuit. This invention is only concerned with the resistive component in the plate circuit. The reactive component may be tuned out by means not a part of this invention.

A peculiar characteristic of the grounded-grid amplifier, which is basic to this invention, is that the resistive component of the plate circuit impedance is proportional to cathode circuit impedance. Any reactive plate current component substantially by-passes the cathode circuit by way of the ground in the grid circuit.

This invention comprises means for detecting input impedance in the cathode circuit of a grounded-grid amplifier and means for varying the output coupling to maintain the cathode impedance constant and thereby maintain the amplifier load constant.

Voltages which are proportional to a desired cathode input impedance are obtained by detectors in the input circuit. One detector is placed in series with the input circuit, and another detector is placed across the input circuit. Therefore the voltage output of one detector is proportional to input current, and the voltage output of the other detector is proportional to input voltage. The detected voltages control a servo system which controls the amount of coupling between the plate circuit and the load.

Other objects, features and advantages of this invention will be apparent from the following description taken in conjunction with the accompanying drawings, in which.

Figure 1:
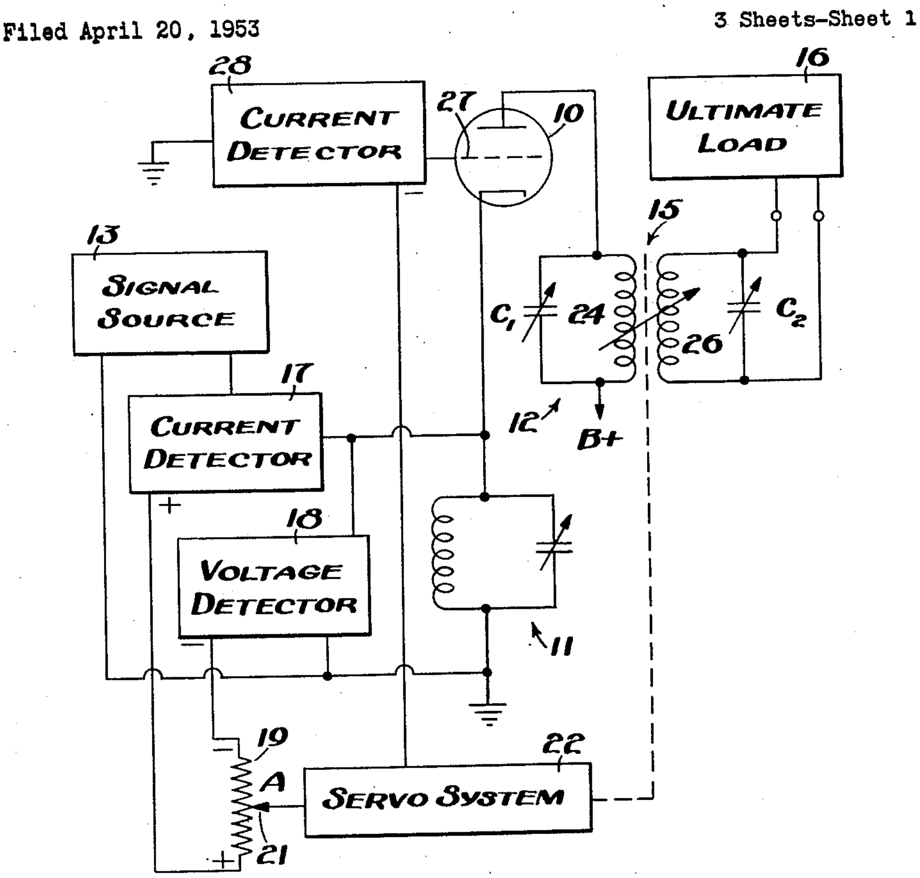
Figure 1 is a block diagram of this invention.

This invention relates to a grounded-grid circuit which, as shown in Figure 1, has a tube 10, a tuned cathode tank circuit 11, and a tuned plate tank circuit 12. A signal source 13 delivers an input signal across tank circuit 11, and the amplifier output is taken from tank circuit 12 and is coupled to an ultimate load 16 through a transformer 15 which has a primary coil 24 and a secondary coil 26. Condenser $C_1$ is connected across coil 24 and condenser $C_2$ is connected across coil 26.

A current detector 17 is connected in series with the input signal and produces a positive direct current voltage, proportional to the signal current. The output of detector 17 is applied to one side of a potentiometer 19. A voltage detector 18 is located in parallel with tank circuit 11 and produces a negative direct current voltage proportional to the signal voltage. The output of detector 18 is applied to the other side of potentiometer 19.

When tube 10 is operated at optimum load, the voltage output from detectors 17 and 18 across potentiometer 19 establishes a point A on potentiometer 19 which has zero voltage to ground and a movable tap 21 is set at this point.

When the plate load varies from optimum, a voltage to ground will exist at point A and will control a servo system 22 that will change the coupling between coils 24 and 26 to again provide optimum plate load.

As servo system 22 adjusts the coupled load back to optimum, the voltage at tap 21 will approach zero and will remain there until the load changes again.

Figure 2:
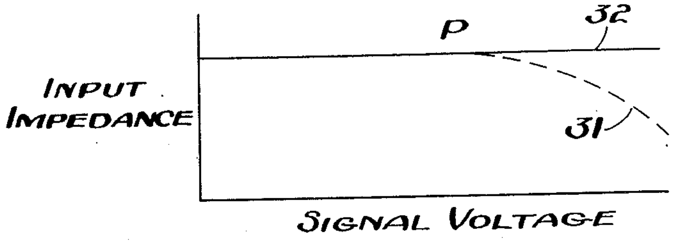
Figure 2 shows the proportionality between input impedance and output circuit resistance.

Grid current causes non-linearity between input impedance and plate load. Curve 31 in Figure 2 shows how input impedance is affected by grid current when the load impedance is held constant. As long as the grid is operated negative at all times, no grid current will ordinarily flow to cause any error. However, under class B and C operation, the grid is usually driven positive and non-linearity exists. Errors result because grid current is a component of the incoming signal and flows through detector 17 to undesirably raise its output voltage. To compensate for errors caused by grid current, a current detector 28 is inserted in series with the grid 27 of tube 10 and produces a voltage proportional to grid current that is fed into servo system 22. Straight line 32 to the right of point P in Figure 2 shows the effect of grid current detector 28. Line 32 shows that input impedance is not affected by grid flow when the circuit is operated with grid detector 28.

Figure 3:
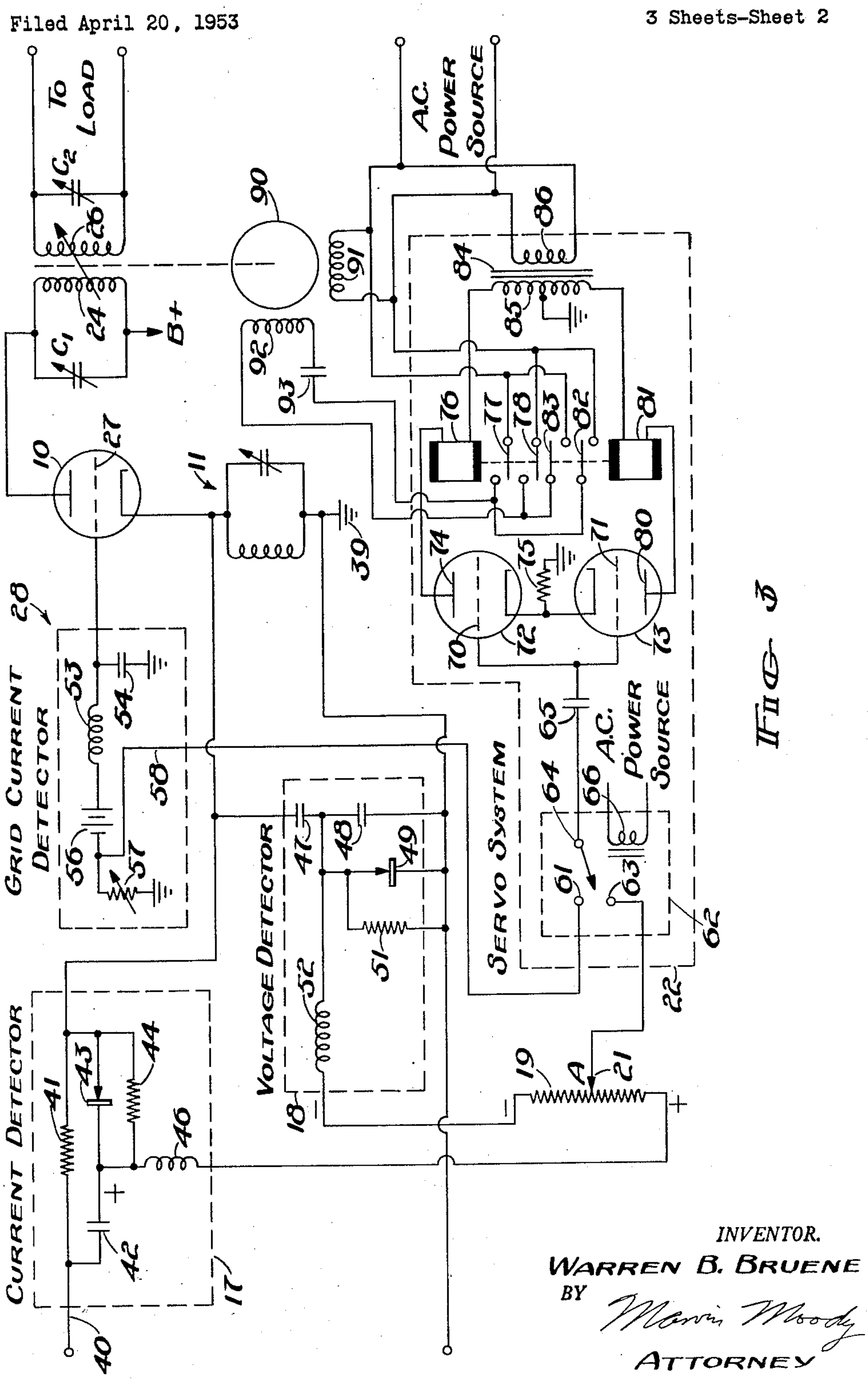
Figure 3 is a schematic diagram which shows one embodiment of the invention.

A detailed circuit diagram of one embodiment of this invention is shown in Figure 3. The components of current detector 17 are: A small resistor 41 in series with the signal input line 40; a condenser 42 and a rectifier 43 connected in series across resistor 41; a resistor 44 connected across rectifier 43; and a choke coil 46 which has one end connected between diode 43 and capacitor 42.

The components of voltage detector 18 are: A pair of condensers 47 and 48 connected in series across tank circuit 11; a rectifier 49 connected across condenser 48; a resistor 51 connected across rectifier 49; and a choke coil 52 connected at one end to the ungrounded side of rectifier 49.

The rectifiers 43 and 49 may be germanium diodes. Rectifier 43 is positioned to produce a positive direct current output voltage, and rectifier 49 is positioned to produce a negative direct current output voltage. It will be observed that rectifiers 43 and 49 have a common direct current ground at point 39. One end of potentiometer 19 is connected to coil 46 of detector 17 and the other end of potentiometer 19 is connected to coil 52 of detector 18.

The components of the grid current detector 28 are: A grounded capacitor 54 connected to a grid 27 of tube 10; a choke coil 53 connected at one end to grid 27; a negative direct current bias supply 56 connected to the other end of coil 53; and a grounded rheostat 57 connected to the other end of supply 56. One end of a lead 58 is connected to the ungrounded side of rheostat 57 and its other end is connected to a terminal 61 in a chopper 62 located in servo system 22.

Tap 21 of potentiometer 19 is connected to a terminal 63 of chopper 62 which has a contact 64 that is vibrated between terminals 61 and 63 by a coil 66 connected to an alternating current power source such as a sixty cycle per second supply. Vibrating contact 64 changes any direct current potential that may exist between contacts 61 and 63 to an alternating potential which is fed to the grids 70 and 71 of the tubes 72 and 73, respectively, through a blocking condenser 65. Choppers are well known to those skilled in the art.

The plate 74 of tube 72 is connected to a relay 76 which has contacts 77 and 78 that are open when the relay is unenergized. Plate 80 of tube 73 is connected to a relay 81 which has contacts 82 and 83 that are open when the relay is unenergized.

The opposite ends of a secondary 85 of a power transformer 84 are connected to relays 76 and 81, respectively. The primary 86 of transformer 84 is connected to an alternating current power supply which causes an alternating plate voltage on tubes 72 and 73. The cathodes of tubes 72 and 73 are grounded through a biasing resistor 75, and the center tap of primary 85 of transformer 84 is grounded.

Relays 76 and 81 control the polarity of a field coil 92 of a servo motor 90 which has another field coil 91 connected directly across an alternating current power source. Coil 92 is in series with a condenser 93 which maintains a ninety degree phase relationship between the currents in the coils 91 and 92. Contacts 77 and 78 are connected to opposite sides of the alternating current source, and their other ends contact the opposite sides of coil 92. Also contacts 82 and 83 have an end connected to opposite sides of coil 92 and their other ends contact the alternating current power source in reversed polarity from contacts 77 and 78.

The armature of motor 90 is mechanically coupled to tank coils 24 and 26 so that the rotation of the armature will vary the distance between coils 24 and 26 to change their electromagnetic coupling. This may be accomplished in any one of many well known ways.

If amplifier tube 10 is operated without grid current, the terminal 61 of chopper 62 is grounded through rheostat 57. The tap 21 is set so that no voltage will exist between terminals 61 and 63 when tube 10 is operated at optimum load. Contact 64 will then produce equal voltages to ground on both tubes 72 and 73.

Figure 4:
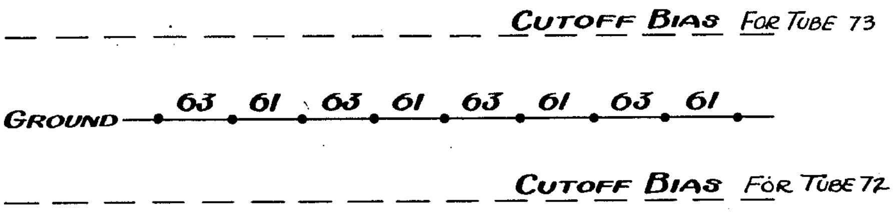
Figure 4 shows the output of chopper 62 at optimum load when no grid current flows.

Figure 4 indicates these voltages on contact 64 as it alternates between terminals 61 and 63. The tubes 72 and 73 are then both biased near cut-off by resistor 97, contacts 77, 78, 82 and 83 remain open, and motor 90 remains stationary to maintain optimum coupling between coils 24 and 26.

However, if the ultimate load, such as from the antenna mentioned above, should increase, the signal current increases through current detector 17 and increases the positive voltage on potentiometer 19. Since the signal voltage and thereby the negative voltage on potentiometer 19 remains substantially the same, the voltage at tap 21 goes positive and a positive potential exists across terminals 61 and 63.

Figure 5:
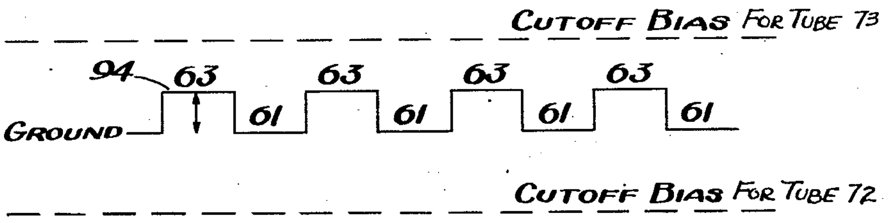
Figure 5 shows the output of chopper 62 when the load is unbalanced by increased plate loading while no grid current is flowing.

As contact 64 is vibrated between terminals 61 and 63, it sets up positive voltage gates 94, as shown in Figure 5 which cause plate current to flow through tube 72 and relay 76 to open contacts 77 and 78. However, the positive gates on the grid of tube 73 drive tube 73 toward cut-off and contacts 82 and 83 remain open. Motor 90 then rotates in a direction that reduces the coupling between coils 24 and 26 and thereby causes the load on tube 10 to again approach optimum.

When the load arrives at its optimum value the positive voltage from detector 17 decreases until no voltage exists between terminals 61 and 63 which decreases the gate to that shown in Figure 4. Relay 76 is again unenergized which causes contacts 77 and 78 to open and motor 90 to stop.

On the other hand, if the tube load resistance should decrease from optimum, the signal current will become smaller and decrease the positive voltage from detector 17 which will result in a negative voltage on tap 21. A negative gate from chopper 62 will cause a plate current through relay 81 and cause contacts 82 and 83 to close and energize coil 92 in opposite polarity to drive motor 90 in the opposite direction. This will increase the coupling between coils 24 and 26. The motor 90 will automatically stop when the plate load adjusts to optimum because the voltage at tap 21 will then become zero and no voltage will exist to unbalance servo 22.

It will be observed that if tube 10 is always operated with a negative grid, no grid current flows to cause error and detector 28 is not then needed and could be left out of the circuit. However, a positive voltage swing on tube 10 will cause grid current to flow and an error will appear in the system in the form of an increased voltage output from detector 17 because there will be a corresponding current increase through detector 17.

Therefore, when grid current flows, such as during modulation peaks, grid detector 28 is necessary to compensate for the error caused by grid current flow.

No rectifier is required in detector 28 because the grid current is already rectified by grid 27. Condenser 54 and inductance 53 in detector 28, condenser 48 and inductance 52 in detector 18, and condenser 42 and inductance 46 in detector 17 smooth out the rectified voltage pulses to provide a smooth direct current voltage output for each detector. The direct current supply voltage 56 is used merely to bias tube 10 as desired.

Figure 6:
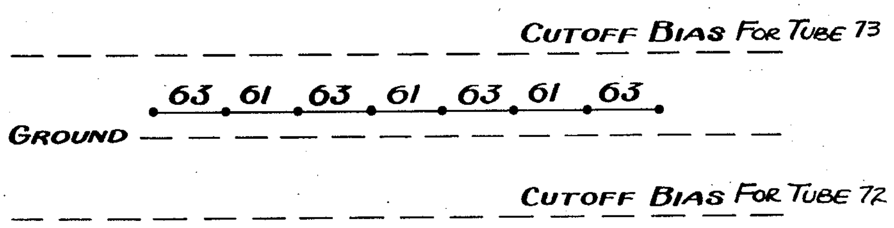
Figure 6 shows the output of chopper 62 at optimum load while grid current is flowing; and, Figure 7 shows the output of chopper 62 when the load is unbalanced while grid current is flowing.

The resistor 57 is adjusted to provide no voltage across terminals 61 and 63 when the plate circuit load is optimum and current flows in grid 27. This condition is indicated in Figure 6 which shows the voltage on contact 64 under conditions of optimum load and grid current flow.

The servo 22 is operated by the net voltage across terminals 61 and 63 which must be proportional to the difference between actual and optimum load. This condition is maintained by detector 18 which causes a compensating voltage rise across resistor 57 and terminal 61 in an amount equal to the voltage rise at terminal 63 due to grid current flow through detector 17 so that the net voltage across terminals 61 and 63 is not affected by grid current.

Figure 7:
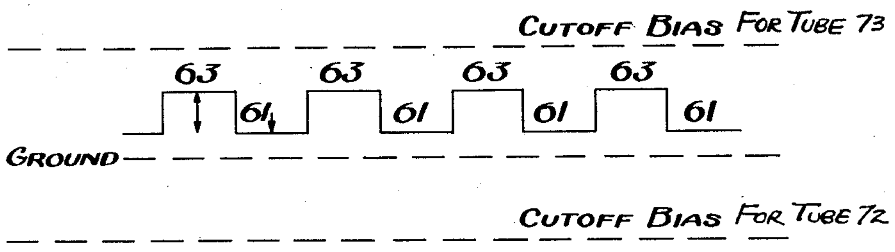

Figure 7 shows an unbalanced voltage condition (during grid current flow) across terminals 61 and 63 due to increased plate loading. This changes to the balanced voltage condition of Figure 6 when the load is again adjusted to optimum.

Although the invention has been described with respect to certain embodiments, it is apparent to one skilled in the art that various changes and modifications can be made therein without departing from the scope of the invention as defined in the appended claims.

I claim:

1. A load regulated grounded-grid circuit comprising, a tube with a control grid, first tuned impedance means connected between the cathode of said tube and ground, a signal source connected across said cathode impedance means, a signal current detector connected in series with said signal source and having a direct voltage output proportional to the signal current, a voltage detector connected in parallel with said cathode impedance means and having a direct voltage output proportional to the signal voltage and having a polarity opposite from said current detector output, a potentiometer comprising a resistor with a variable tap with one end of the resistor connected to the output of the signal current detector and the other end of the resistor connected to the output of the voltage detector, a grid current detector connected serially with the grounded-grid of said tube and having a direct voltage output proportional to grid current, second tuned impedance means with a variable resistive component connected serially between the plate of said tube and said load, servo means with its error input connected between the tap on said potentiometer and the output of said grid current detector, and coupling means connected between the output of said servo system and said second impedance means whereby its resistive component is varied in a manner to equalize the voltage on said tap with the voltage output of said grid current detector.

2. A load regulated grounded-grid circuit comprising, a tube with a control grid, a tuned cathode tank circuit connected between the cathode of said tube and ground, an ungrounded input terminal, a first resistor connected serially between the cathode and said input terminal, a first rectifier, a first capacitor connected serially with said first rectifier and both connected across said resistor, a second resistor connected across said first rectifier, a first choke coil with one side connected to a point between said first rectifier and said first condenser, a voltage divider comprising a plurality of condensers serially connected across said tank circuit, a rectifier connected between ground and an intermediate point on said divider, a third resistor connected across said second rectifier, a second choke coil with one end connected to the intermediate point on said divider, a potentiometer comprising a resistor with a variable tap with one end of the resistor connected to the other side of said first choke coil and the other end of the resistor connected to the other side of said second choke coil, the polarity of the first and second rectifiers arranged to provide direct voltages of opposite polarity to the ends of said potentiometer resistor, a second condenser connected between the control grid of said tube and ground, a bias voltage supply connected to said grid, a third choke coil with one side connected between the control grid and bias voltage supply, a grounded rheostat connected to the other side of said bias voltage supply, a tuned plate tank circuit connected between the plate of said tube and a B plus supply, a variable transformer with a primary in said plate tank circuit and a secondary connected to said load, a servo system with its error voltage input connected between the tap on said potentiometer and the ungrounded side of said rheostat, the output of said servo system connected to said variable transformer to vary the load coupling between the secondary and primary, and the tap adjusted to provide a voltage equal to the voltage across said rheostat at the optimum plate load of said tube.

3. A load regulated grounded-grid circuit comprising, a tube with a control grid, a tuned cathode tank circuit connected between the cathode of said tube and ground, an ungrounded input terminal, a first resistor connected between the cathode and said input terminal, a first rectifying means connected across said first resistor, a first choke coil with one end connected to the output of said first rectifying means, a voltage divider of high impedance connected across said cathode tank circuit, a second rectifying means connected between ground and a portion of said voltage divider, a second choke coil connected at one end to the output of said second rectifying means, a potentiometer comprising a resistor with a variable tap with one end of the resistor connected to the remaining end of said first choke coil and the other end of the resistor connected to the remaining end of said second choke coil, said first and second rectifying means arranged to provide voltage outputs of opposite polarity, a tuned plate tank circuit connected in series with the plate of said tube, said tank circuit provided with a variable resistive coupling to said load, a servo system, the input to said servo connected between said tap and ground whereby an error voltage is provided between the tap voltage and ground, and the output of said servo system connected to the variable resistive coupling of said plate tank circuit to regulate the load on said tube whereby the voltage on said tap is at ground level when said resistive coupling is at optimum value.

4. Means for maintaining a constant plate load on a grounded-grid amplifier comprising, an amplifier tube with at least a control grid, a tuned plate tank circuit connected serially with the plate of said amplifier tube, a tuned cathode tank circuit connected between ground and the cathode of said tube, an ungrounded input terminal, a current detector with a low impedance connected serially between said input terminal and the cathode of said tube and having an output of one polarity, a voltage detector with a high impedance connected across said cathode tank circuit and having an output with a polarity opposite from the output of said current detector, a potentiometer connected on one side to the output of the voltage detector and connected on the other side to the output of the current detector, an ultimate load, the plate tank circuit connected in tandem between said load and the plate circuit of said tube, a servo system, the variable tap of said potentiometer connected to the input to said servo system to provide an error voltage between it and ground, and the output of said servo system connected to said plate tank circuit to vary the resistive coupling to match the resistive component of said ultimate load to the required resistance for said plate circuit.

5. Means for maintaining a constant plate load on a grounded grid amplifier comprising, an amplifier tube, a tuned plate tank circuit connected serially to said amplifier tube, a tuned cathode tank circuit connected between ground and the cathode of said tube, a signal source connected across the cathode tank circuit, a voltage detector also connected across the cathode tank circuit and having an output of one polarity, a current detector connected serially with the signal source and having an output with a polarity opposite said voltage detector output, a potentiometer connected between the outputs of said voltage and current detectors, a variable load, a plate tank circuit connected in tandem between the plate circuit of said tube and said load, a servo system, a second current detector connected in series with the grid of said electron tube and providing an output of either polarity, a chopper with its movable contact connected to receive the input of said servo system and its fixed contacts connected respectively to the tap and the output of said second current detector, the output of said servo system connected to said plate tank circuit to vary its resistive coupling with the load in a direction that always brings the error voltage toward zero.

6. Error voltage means for controlling a servo motor that varies a transformer coupling between a load and tuned plate circuit of a grounded-grid amplifier tube which has a cathode impedance connected across a signal source, a first current detector connected in series between the signal source and the cathode of said tube and having an output of one polarity, a voltage detector connected across the cathode impedance of said amplifier and having an output of opposite polarity, a potentiometer connected between the outputs of said current and voltage detectors, a movable tap forming a part of said potentiometer, a second current detector connected in series with the grounded grid of said amplifier tube, a servo amplifier with its input connected between said tap and the output of said second current detector to obtain an error voltage, a servomotor with its shaft connected to the transformer coupling, and the output of said servo amplifier connected to said servomotor which thereby adjusts a matched resistance between the load and the tube when the error voltage is zero.

7. Means for controlling a servo output to vary a resistive coupling to match the resistance of an unpredictably varying load to the plate resistance of a tuned grounded-grid amplifier comprising, impedance means connected between ground and the cathode of said tube, a signal source connected serially to said impedance means, a first current detector connected serially with said source and having a direct output of one polarity, a voltage detector connected across said cathode impedance means and having a direct output of opposite polarity, a potentiometer connected between the outputs of the voltage detector and the first current detector, a grid current detector connected in series with the grid of said tube and having a direct output, an adjustable tap forming a part of said potentiometer, said tap adjusted to a voltage equal to the output of said grid current detector when the tube is operated at optimum load, a servo system with its error voltage input connected between said movable tap and the output of said grid current detector, and the output of said servo connected to the resistive coupling to maintain it at the matched value at zero error voltage.

8. A load regulated grounded-grid circuit comprising, a tube with a grounded control grid, a cathode tank circuit connected between the cathode of said tube and ground, a first input terminal, a second input terminal connected to ground, a current detector connected between said cathode and first input terminal, said current detector providing a direct voltage output proportional to the input current, a voltage detector connected across said cathode tank circuit, and said voltage detector providing a direct voltage output proportional to the input voltage and having a polarity opposite from the output of said current detector, a voltage divider with one end connected to the output of said current detector and the other end connected to the output of said voltage detector, a plate tank circuit connected serially to the plate of said tube, a variable transformer with its primary forming a part of said plate tank circuit, the secondary of said transformer connected to the load, a servo system with an input connected to an intermediate point on said voltage divider, and the output shaft of said servo system connected to said variable transformer to maintain a constant load on said tube by varying the coupling between the primary and secondary.

References Cited in the file of this patent

UNITED STATES PATENTS

| | | |
|---|---|---|
| 2,230,546 | Rothe | Feb. 4, 1941 |
| 2,358,454 | Goldstine | Sept. 19, 1944 |
| 2,415,799 | Reifel et al. | Feb. 11, 1947 |
| 2,574,868 | Green | Nov. 13, 1951 |
| 2,609,510 | Wilmotte | Sept. 2, 1952 |